(12) United States Patent
Arroyo et al.

(10) Patent No.: US 6,379,636 B2
(45) Date of Patent: Apr. 30, 2002

(54) METHOD FOR LEACHING NICKELIFEROUS LATERITE ORES

(75) Inventors: J. Carlos Arroyo, Sparks; James D. Gillaspie; David A. Neudorf, both of Reno; Erik M. Weenink, Sparks, all of NV (US)

(73) Assignee: BHP Minerals International, Inc., Houston, TX (US)

(*) Notice: Subject to any disclaimer, the term of this patent is extended or adjusted under 35 U.S.C. 154(b) by 0 days.

(21) Appl. No.: 09/433,110

(22) Filed: Nov. 3, 1999

(51) Int. Cl.[7] .............................. C22B 23/00; C22B 3/00
(52) U.S. Cl. .................... 423/141; 423/143; 423/150.1; 423/150.4
(58) Field of Search .......................... 423/150.4, 150.1, 423/140, 141, 142, 143

(56) References Cited

U.S. PATENT DOCUMENTS

| | | | |
|---|---|---|---|
| 3,466,144 A | * | 9/1969 | Kay ........................ 423/150.1 |
| 3,720,749 A | | 3/1973 | Taylor et al. |
| 3,804,613 A | | 4/1974 | Zundel et al. |
| 3,991,159 A | | 11/1976 | Queneau et al. |
| 4,042,474 A | | 8/1977 | Saarinen |
| 4,044,096 A | * | 8/1977 | Queneau et al. ......... 423/150.4 |
| 4,097,575 A | | 6/1978 | Chou et al. |
| 4,410,498 A | | 10/1983 | Hatch et al. |
| 4,541,868 A | | 9/1985 | Lowenhaupt et al. |
| 4,548,794 A | | 10/1985 | Lowenhaupt et al. |
| 5,447,552 A | | 9/1995 | Mihaylov et al. |

FOREIGN PATENT DOCUMENTS

| | | |
|---|---|---|
| CA | 618 826 A | 4/1961 |
| WO | WO 96 41025 | 12/1996 |

* cited by examiner

Primary Examiner—Steven Bos
(74) Attorney, Agent, or Firm—Brinks Hofer Gilson & Lione; G. Peter Nichols (57) ABSTRACT

A process is provided for the leaching of both the "limonite" (Fe approx. $\geq 25\%$ and Mg approx. $\geq 6\%$) and "saprolite" (Fe approx. $\leq 20\%$ and Mg approx. $\geq 10\%$) fractions of typical nickel and cobalt bearing laterite ore. The low magnesium fraction of the laterite ore is leached with sulfuric acid at high pressure and temperature to solubilize the metal values while precipitating most of the solubilized iron as hematite or other iron compounds and a portion of the dissolved aluminum as alunite or other aluminum compounds. After reducing the pressure of the leach slurry to approximately atmospheric pressure, the pregnant leach slurry or solution is contacted with the high magnesium fraction of the ore to solubilize most of the nickel contained in the high-magnesium ore fraction while dissolving only a small portion of the iron content of the high magnesium ore fraction. Further neutralization of the leach slurry in the presence of an alkali metal or ammonium ion will allow the precipitation of iron-bearing jarosite at ambient pressure. This process for incorporating the leaching of saprolite in the high pressure leaching process for limonite ores requires neither high temperature and pressure, nor special treatment of the saprolite ore fraction, nor the addition of special reagents, e.g. reducing reagents.

20 Claims, 2 Drawing Sheets

METHOD FOR LEACHING NICKELIFEROUS LATERITE ORES

FIELD OF THE INVENTION

The present invention relates to the hydrometallurgical processing of nickeliferous ores and, in particular, to an improved method for leaching nickel values from the high-magnesium or saprolite fraction of such ores in combination with high pressure and temperature leaching of the limonite fraction of the ore.

BACKGROUND OF THE INVENTION

The high pressure and temperature leaching of the limonite portion of nickeliferous laterite ores with sulfuric acid is well known, having been practiced commercially at Moa Bay in Cuba since 1959 (Boldt and Queneau, "The Winning of Nickel," Longmans Canada Ltd., Toronto, pp. 437–449). The quantity of sulfuric acid required to leach the major portion (approx. $\geq 90\%$) of the contained nickel and cobalt and variable portions of several impurity elements in the ore, e.g. magnesium, manganese, iron, aluminum, chromium, is in excess of that required to form the corresponding water-soluble metal sulfate compounds. This is because sulfuric acid only dissociates to the single proton ($H^+$) and the bisulfate ($HSO_4^-$) ion at the high temperature used in this leaching step, typically $\geq 200°$ C. The bisulfate ion dissociates on cooling of the leach slurry to sulfate ($SO_4^{2-}$) ion, releasing an additional proton. Thus, the cooled leach slurry inevitably contains excess sulfuric acid in addition to the dissolved metal values and impurity elements. This excess acid must be neutralized before recovery of the dissolved nickel and cobalt values, as would be apparent to anyone skilled in the art. The cost of the excess sulfuric acid that must be added to the leaching step and the cost of neutralizing agents required to neutralize excess sulfuric acid in the final leach liquor are significant disadvantages of this process.

Furthermore, the efficient recovery of nickel and cobalt in substantially pure form from the high pressure leach liquor often requires the prior removal of impurities such as ferric iron, aluminum, and chromium, which dissolve to a greater or lesser extent during pressure leaching. These impurities may interfere in downstream nickel and cobalt recovery processes if not removed from the solution. The removal can be effected by raising the pH of the leach liquor to effect the hydrolysis and precipitation of these impurities as hydroxide or hydroxysulfate compounds. Unfortunately, when carried out at atmospheric pressure and temperatures below the solution boiling point, this hydrolysis often produces voluminous precipitates that are difficult to separate from the pregnant liquor by conventional settling and filtration techniques. A further disadvantage is the co-precipitation and subsequent loss of significant quantities of the nickel and cobalt values during this hydrolysis step.

A variety of methods have been developed to deal with the above-mentioned disadvantages and problems of the high pressure leaching process.

Taylor et al. (U.S. Pat. No. 3,720,749) teach the precipitation and removal of iron and aluminum by the addition of a soluble neutralizing agent, e.g. magnesia, to the leach liquor at a temperature in excess of 130° C. thereby precipitating the iron and aluminum in an easy to separate form.

An improvement of the neutralization process was patented by Lowenhaupt et al. (U.S. Pat. No. 4,548,794). This patent teaches the recovery of nickel and cobalt from laterite ore by using a low-pressure leach of high magnesium ore, after high pressure leaching of low magnesium ore, to precipitate aluminum and iron. A size separation of the laterite ore feed is made to produce low and high magnesium ore fractions for the process. The finer, low magnesium fraction is leached at high temperature and pressure and, after separating the pressure leach liquor form the leach residue, contacting the liquor with the coarser, high magnesium fraction of the ore at greater than atmospheric pressure and high temperature such that iron and aluminum precipitate in crystalline forms, e.g. hematite, alunite. This aids the subsequent settling and filtration of the precipitated iron and aluminum, while also dissolving additional nickel units from the high magnesium fraction of the ore. The preferred temperature for the neutralization step ranges from 140° to 200° C. and requires the use of autoclaves to maintain the elevated temperature and pressure. The patent also describes a method where high magnesium ore is contacted at atmospheric pressure and temperatures less than the boiling point, with the leach solution from the pressure leach step, before the low-pressure leach step. Nickel extraction is very low in the atmospheric leach step (only 33–44%) and the low-pressure leach is still required to achieve adequate nickel extraction and to precipitate iron and aluminum in an easy to settle and filter form.

Other methods for using the high magnesium fraction of the ore to neutralize the high-pressure leach liquor have been patented. U.S. Pat. No. 3,991,159 teaches the use of high magnesium ore to neutralize acid resulting from the high-pressure acid leach of a low magnesium ore. This is accomplished by coordinating the leaching of the low magnesium fraction with the leaching of the high magnesium fraction at high temperature and pressure. In this method, leaching of the high magnesium fraction is carried out at high temperature (150–250° C.) and pressure for effective iron and aluminum rejection, but with relatively low nickel extraction from the high magnesium ore. Again, this process has the disadvantage of requiring relatively high temperature and pressure for the neutralization step.

In U.S. Pat. No. 3,804,613, a method to conduct high-pressure acid leaching of high magnesium ore at relatively low acid/ore ratios is disclosed. This is accomplished by preconditioning the high magnesium ore with leach liquor from the high-pressure leach step, before a high-pressure leach of the conditioned high magnesium ore. The high magnesium ore must still be submitted to a high pressure leaching step following the atmospheric pressure conditioning step.

U.S. Pat. No. 4,097,575 teaches the use of high magnesium ore that has been previously roasted to neutralize acid present in a leach slurry resulting from the high-pressure acid leach of a low magnesium ore. The high magnesium ore is thermally treated at 500°–750° C. under oxidizing conditions prior to the neutralization step to increase the neutralization capacity of the ore. The pH of the final liquor is taken above 2, but the neutralization residue containing unleached high magnesium ore is recycled to the autoclave to obtain higher nickel recovery. Furthermore, rejected iron and aluminum are in the form of hydroxides, which are difficult to deal with. This process suffers from the high capital cost needed for roasting facilities and disadvantages associated with injection of high magnesium ore atmospheric leach slurry into the high pressure autoclave.

U.S. Pat. No. 4,410,498 teaches a method to leach high magnesium laterite ore with sulfuric acid at a controlled pH of 1.5 to 3.0 while adding a reducing agent to maintain the redox potential between 200 and 400 mV (vs. saturated calomel reference electrode). The addition of a reducing agent increases the reactivity of the serpentine in the ore and results in maximum extraction of nickel consistent with minimum extraction of iron and magnesia and minimum acid consumption. The process has the disadvantages of the additional cost of the reducing agent, the need for electrochemical potential control, and the need for equipment to control the leaching atmosphere and prevent external discharges in the case of toxic, gaseous reductants such as sulfur dioxide.

The above methods are aimed at utilizing both the high and low magnesium fractions of the nickeliferous laterite ore in order to fully utilize the ore body, maximize the nickel and cobalt extraction and minimize the iron and/or aluminum content of the final leach liquor. All of these methods require the use of one of the following to leach the high magnesium ore effectively: a) elevated temperature and pressure; b) pretreatment by calcination or roasting, or; c) addition of a reducing agent with controlled pH.

It is an object of the current invention to combine the leaching of the high magnesium fraction of the ore with the high pressure leaching of the low magnesium portion of the ore, without the use of elevated temperature and pressure, calcination pretreatment, or addition of reducing agents, and still achieve high nickel and cobalt recoveries, relatively short leaching time, low iron extraction to solution and good solid/liquid separation properties.

In most practices, pH adjustment of the leach slurry causes the precipitation of metal hydroxides, including the hydroxides of ferric iron, chromium and aluminum, which are separated from the leach solution in the subsequent liquid/solid separation. During this process, nickel and cobalt co-precipitate with the metal hydroxides and reduce the metals recovery. Another important consideration is the efficiency of the liquid/solid separation process. In general, hydroxides produced at atmospheric pressure are colloidal and difficult to filter or settle, thus requiring very large equipment for effective separation. On the other hand, alkali metal or ammonium jarosite is crystalline, which makes it easier to filter and settle. In the presence of an alkali metal or ammonium ion and in a certain range of pH, ferric iron will form jarosite, a basic sulfate compound of the formula $M[Fe_3(SO_4)_2(OH)_6]$ where M is sodium, lithium, potassium or ammonium.

It is a further object of this invention to provide a solution that is very low in iron by the formation of jarosite at atmospheric pressure in the presence of alkali metal or ammonium ions. The loss of nickel and cobalt by precipitation as metal hydroxides is minimized, resulting in maximum metals recovery, while an easier to settle iron compound is formed.

SUMMARY OF THE INVENTION

The present invention provides a process for the efficient leaching of both the low magnesium and high magnesium fractions of nickel laterite ore. The low magnesium fraction of the ore is leached at high temperature and pressure, as in other processes previously described. No special reductants, pretreatment steps or high pressure steps are required to leach the high magnesium fraction of the ore, representing substantial simplification over the prior art. The current invention also provides for the removal of iron by the formation of alkali metal jarosite, e.g. sodium jarosite, to produce a low iron solution suitable for nickel and cobalt recovery.

DETAILED DESCRIPTION OF THE INVENTION

The present invention provides a novel method for combining the leaching of the high magnesium fraction of nickeliferous laterite ore with the high pressure leaching of the low magnesium fraction of the ore, while maximizing the extraction of nickel and cobalt.

Figure 1:
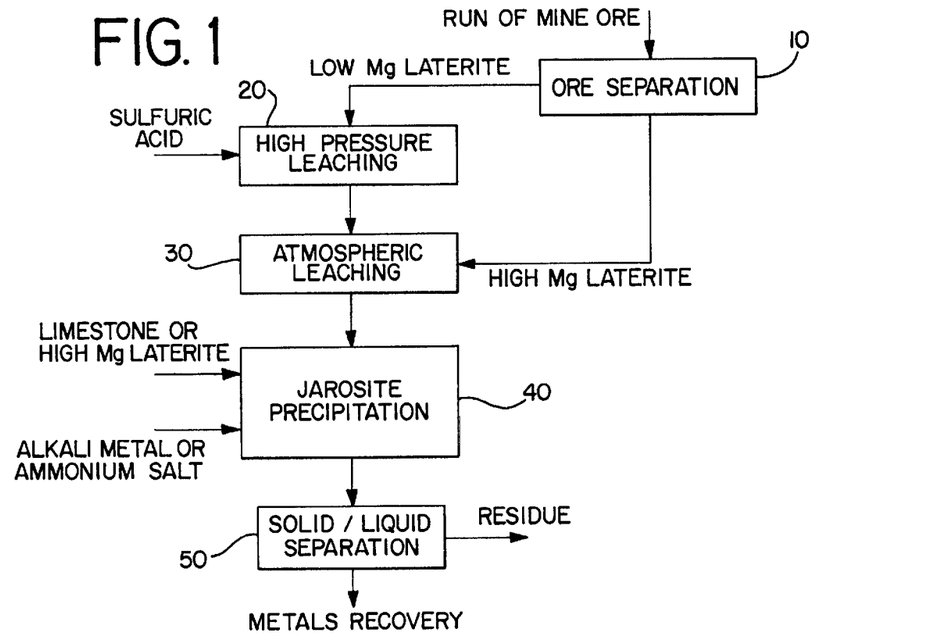
FIG. 1 is a flow sheet of one embodiment of the process of the present invention.

Referring to FIG. 1, laterite ore is separated into two fractions 10. This separation can be based on selective mining or on size classification by, for example, screening. One fraction is finer than the other and has a lower magnesium content. This low magnesium laterite, or so-called limonite, is mixed with water to provide an aqueous pulp. This pulp is leached with sulfuric acid at elevated temperature (at least about 200° C.) and pressure. During this leaching process 20, most metals in the ore are completely or partially solubilized.

Upon completion of the leaching reaction, typically within 30 to 45 minutes, the pressure leach slurry is discharged to atmospheric pressure and cooled to a temperature at or near the normal boiling point of the leach solution. Steam is "flashed" off during this step. The leach slurry, or leach liquor after solid/liquid separation to remove the pressure leaching residue, is now contacted 30 at atmospheric pressure with the other laterite fraction. The high magnesium laterite or saprolite is used to neutralize the free acid in the leach liquor at a temperature of 80° to 98° C., preferably above 90° C. This temperature is conveniently the temperature of the low magnesium ore leach slurry after flashing to atmospheric pressure. The free sulfuric acid concentration in the pressure leach solution is typically 20 to 100 g/L $H_2SO_4$. The quantity of high magnesium ore or saprolite added is calculated based on the pre-determined acid consumption properties of the saprolite and the quantity of free acid in the pressure leach solution. It is not necessary to control the pH of the leach slurry, unlike the teaching of U.S. Pat. No. 4,410,498. In fact, the relatively low pH, typically <1.0, or high acidity of the pressure leach solution is advantageous in that the rate of saprolite leaching is higher at lower pH. Surprisingly, it is also unnecessary to add a reducing agent to control the oxidation/reduction potential (see FIG. 3 in U.S. Pat. No. 4,410,498) of the slurry in order to effect rapid leaching of the saprolite at the higher acid concentration prevailing in the pressure leach slurry or solution.

A high nickel extraction from the high magnesium ore is possible in this process, without the need of ore pretreatment or the use of any other reagents to increase the reactivity of the ore.

Figure 2:
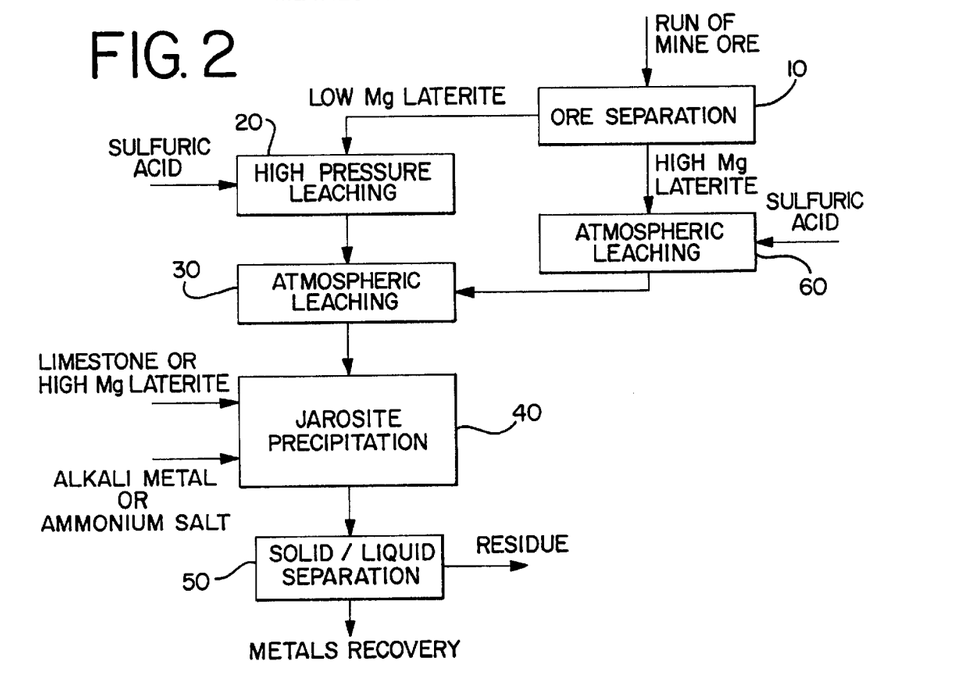
FIG. 2 shows another embodiment of the process of the present invention.

Referring to FIG. 2, in another embodiment of this invention, the high magnesium fraction of the laterite ore is first leached 60 with additional sulfuric acid. The quantity of acid to be added is calculated from the predetermined acid consumption properties of the saprolite ore, the quantity of free acid in the pressure leach solution and the desired limonite to saprolite processing ratio. In this process, nickel and other metals will be solubilized. This embodiment of the invention allows the ratio of limonite to saprolite ore to be varied while maintaining high overall nickel and cobalt extractions and minimal iron extraction. Addition of the additional sulfuric acid directly to the hot, pressure leach slurry prior to the addition of saprolite causes redissolution of iron compounds that were precipitated during the pressure leaching step. The iron redissolution is largely avoided by mixing the additional acid with all or a portion of the saprolite ore prior to mixing with the pressure leach slurry.

The terminal acidity of the slurry after neutralization with saprolite is advantageously 5–10 g/L free sulfuric acid. If the free acid to saprolite ratio in the overall feed to the saprolite neutralization step is too low, the leach extraction will be lowered. On the other hand, if the free acid to saprolite ratio is too high, there will be excess acid in the final neutralization slurry that requires neutralization prior to iron precipitation.

In another embodiment of the process, the saprolite neutralization step is carried out continuously in a series of agitated tanks. The number and size of the tanks is chosen to maximize the rate of leaching and minimize the overall retention time required to achieve the desired nickel extraction from the saprolite. Multiple tanks are used in order to carry out the leaching process at the highest average acidity possible. This increases the rate of reaction because the leaching rate increases as the sulfuric acid concentration increases.

During any step prior to the jarosite formation 40, a precipitating agent selected from the group consisting of alkali metal ions, ammonium ions or mixtures thereof can be added to the process. Preferably, the precipitating agent is a source of sodium ions. One method is to recycle sodium sulfate solution from the downstream recovery process. This is the filtration product in the formation of a metal carbonate precipitate. The formation of iron jarosite is advantageously carried out at temperatures of about 90° C. to 100° C. under atmospheric pressure for at least two hours and at a pH of 1.6 to 2.0 (preferably at 1.8). The acid that is produced from the iron hydrolysis can be neutralized with any neutralizing agent to maintain the desired pH. Examples of the neutralizing agent include but are not limited to limestone, lime or magnesia. Alternatively, more high magnesium laterite can be added to neutralize the acid that is produced by the formation of jarosite. Jarosite precipitation occurs at much lower pH values than iron hydroxide precipitation and virtually eliminates the problem of co-precipitation of nickel and cobalt and their subsequent loss.

After the formation of jarosite, the leach slurry proceeds to the liquid/solid separation process 50. This is preferably a counter current decantation circuit, which produces a solids residue virtually void of nickel and cobalt, and a clear leach liquor to proceed to the metals recovery.

The following examples illustrate, but do not limit, the present invention. Unless otherwise indicated, all parts and percentages are by weight.

EXAMPLE 1

This example illustrates the atmospheric leaching of saprolite ore with sulfuric acid solutions at constant acid concentration and at temperatures between 80° and 90° C. Saprolite ore was pulped at 15% solids in deionized water and agitated in a well-sealed kettle with sulfuric acid at either 80° or 90° C. The concentration of sulfuric acid was kept constant during the tests. Samples of liquid were taken at different times during the test for analysis. The solids at the end of the tests were filtered, washed, dried and split for chemical analysis. Table 1 shows the final leaching results for each test.

TABLE 1

Results of saprolite atmospheric leach tests conducted at constant sulfuric acid concentration

| Acid conc. (g/L) | Temp. (° C.) | Sample ID | Wt (g) | Composition | | | Extraction (%) | | | Acid consumption | |
|---|---|---|---|---|---|---|---|---|---|---|---|
| | | | | Ni | Fe | Mg | Ni | Fe | Mg | Kg/tonne ore | Kg/Kg Ni |
| 100 | 80 | Ore | 50 | 1.92 | 8.01 | 14.10 | 94 | 84.2 | 79.7 | 599 | 32.26 |
| | | Residue | 30.2 | 0.192 | 2.1 | 4.75 | | | | | |
| 50 | 80 | Ore | 50 | 1.87 | 7.14 | 13.59 | 89.7 | 66.2 | 77.7 | — | — |
| | | Residue | 31.1 | 0.309 | 3.89 | 4.87 | | | | | |
| 25 | 80 | Ore | 50 | 1.87 | 7.35 | 13.91 | 77.6 | 38.7 | 66.4 | 529.6 | 34.89 |
| | | Residue | 34.6 | 0.606 | 6.51 | 6.77 | | | | | |
| 10 | 90 | Ore | 233.5 | 1.91 | 7.31 | 16.07 | 70.1 | 31.6 | 71.8 | 625.0 | 45.50 |
| | | Residue | 192.6 | 0.693 | 6.06 | 5.49 | | | | | |

Figure 3:
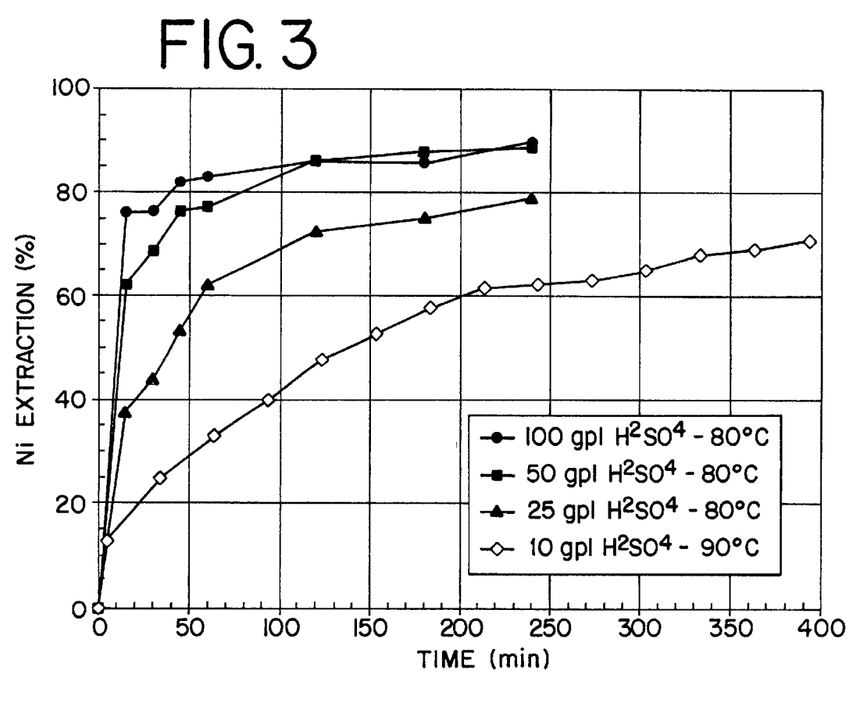
FIG. 3 is a graph showing the rate of nickel extraction from high magnesium containing ore, or saprolite, as a function of sulfuric acid concentration.

These results show that saprolite ore is effectively leached with sulfuric acid at temperatures close to the boiling point at atmospheric pressure without the need of any ore pretreatment or additional reagents during leaching. The data also show that at lower acid concentrations the kinetics of iron dissolution lag behind those of nickel and magnesium dissolution resulting in a high nickel extraction and low iron extraction. This is an important criterion since iron poses a problem in the downstream recovery of nickel by means known to those skilled in the art. A process in which high nickel and low iron dissolution from saprolite ore can thus be devised by leaching the ore with acid concentrations below about 50 g/l. The nickel extraction as a function of time is illustrated in FIG. 3, which shows that the rate of nickel extraction is a strong function of the sulfuric acid concentration.

EXAMPLE 2

Figure 4:
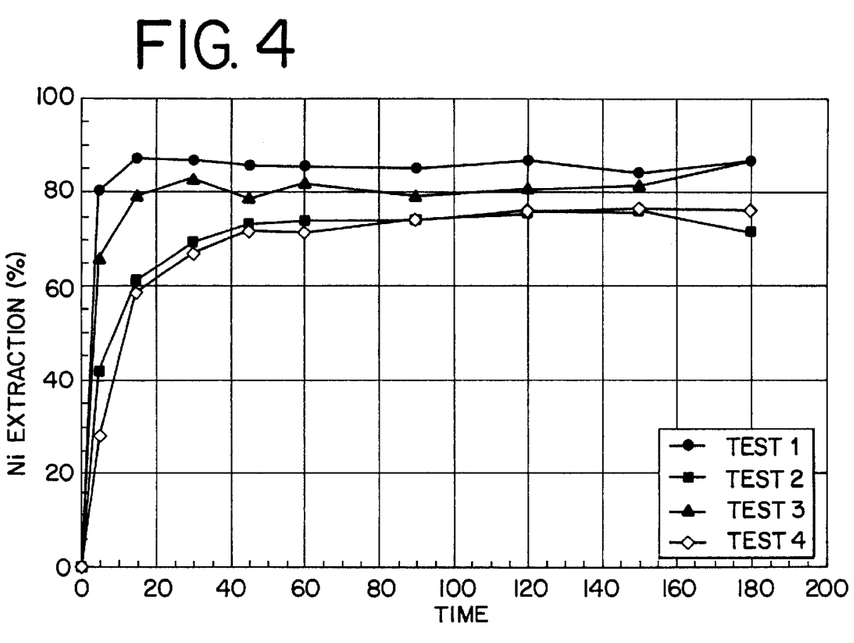
FIG. 4 is a graph showing the rate of nickel extraction as a function of time during atmospheric leaching of saprolite ore with sulfuric acid at 90° C.

This example illustrates the atmospheric leaching of saprolite ore with a fixed amount of sulfuric acid solution at 90° C. Saprolite ore was pulped at 15% solids in deionized water and agitated in a well-sealed kettle with sulfuric acid at 90° C. for 3 hours. The initial sulfuric acid concentration varied from 106 to 114 g/L in the 4 tests described. Samples of liquid were taken at different times during the test for analysis. The solids at the end of the tests were filtered, washed, dried and split for chemical analysis. Table 2 shows the final leaching results for each test and FIG. 4 shows the kinetics of nickel dissolution from saprolite ore.

and increase the saprolite to limonite ratio (tests 3–5). Saprolite leaching was carried out in an agitated tank at 90° C. for 3 hours. The results from each test are shown in Table 4.

TABLE 2

Results of saprolite atmospheric leach with sulfuric acid at 90° C.

| Test No. | Initial [H$_2$SO$_4$] (g/L) | Sample ID | Wt (g) | Composition Ni | Fe | Mg | Extraction (%) Ni | Fe | Mg | Acid consumption Kg/ton | Kg/Kg Ni |
|---|---|---|---|---|---|---|---|---|---|---|---|
| 1 | 106 | Ore | 107.8 | 1.91 | 7.45 | 15.90 | 86.7 | 28.7 | 86.6 | 559 | 33.6 |
|   |     | Residue | 71.8 | 0.38 | 7.98 | 3.19 |     |     |     |     |     |
| 2 | 106 | Ore | 165.9 | 1.11 | 9.10 | 14.60 | 76.2 | 36.4 | 65.6 | 512 | 60.5 |
|   |     | Residue | 103.5 | 0.42 | 9.28 | 8.07 |     |     |     |     |     |
| 3 | 114 | Ore | 167 | 2.04 | 8.54 | 15.30 | 84.1 | 46.3 | 76.3 | 565 | 32.9 |
|   |     | Residue | 104.7 | 0.51 | 7.27 | 5.73 |     |     |     |     |     |
| 4 | 101 | Ore | 164 | 1.28 | 11.40 | 16.10 | 73.7 | 33.3 | 69.6 | 507 | 53.8 |
|   |     | Residue | 112.4 | 0.50 | 11.20 | 7.21 |     |     |     |     |     |

The variation of final nickel extraction between the various tests is due mostly to the different amount of acid used in each test and to the variation of composition of the samples. Metal and free acid concentrations in solution as a function of time are shown in Table 3. Approximate metal extractions were calculated from the solution assays over time. These data show that most of the nickel dissolves within the first 15 minutes of leaching when the acid concentration is higher. After this time, saprolite continues to react at much slower rates until most of the acid is consumed. Since saprolite ore was leached at acid concentrations under 50 g/l for most of the test period, the final iron dissolution was relatively low.

TABLE 3

Solution composition as a function of time during the atmospheric leaching of saprolite ore at 90° C. (Test 3)

| Time (min) | Solution concentration (g/L) Ni | Fe | Mg | H$_2$SO$_4$ | Extraction (%) Ni | Fe | Mg |
|---|---|---|---|---|---|---|---|
| 0 | 0 | 0 | 0 | 114 | 0 | 0 | 0 |
| 5 | 2.37 | 4.4 | 11.4 | 34.4 | 65.9 | 29.4 | 42.2 |
| 15 | 2.82 | 5.4 | 14.9 | 21.6 | 79.3 | 36.5 | 55.7 |
| 30 | 2.91 | 5.6 | 16.1 | 16.7 | 82.6 | 38.1 | 61.0 |
| 45 | 2.72 | 5.4 | 15.5 | 13.7 | 78.6 | 37.4 | 59.5 |
| 60 | 2.80 | 5.6 | 16.4 | 12.3 | 81.7 | 39.1 | 63.6 |
| 90 | 2.67 | 5.2 | 15.5 | 9.3 | 79.1 | 36.9 | 61.1 |
| 120 | 2.69 | 5.1 | 15.9 | 7.8 | 80.5 | 36.9 | 63.2 |
| 150 | 2.68 | 5.4 | 16.6 | 6.9 | 81.3 | 38.7 | 66.4 |
| 180 | 2.85 | 5.5 | 17.4 | 6.9 | 86.9 | 40.3 | 70.3 |

EXAMPLE 3

This example illustrates the atmospheric leaching of saprolite ore with the product leach slurry from pressure leaching of low magnesium, or limonite, ore. Limonite ore was first leached in a titanium autoclave for 30 minutes at an acid to ore ratio of 0.38, 270° C. and 40 wt % solids. After leaching and pressure letdown, saprolite ore was added as a 50 wt % slurry to neutralize the remaining free acid in the autoclave discharge that results from the bisulfate-sulfate shift at low temperatures. The saprolite to limonite ratio, when leaching saprolite in this manner, was about 0.17 (tests 1 and 2). In some cases, concentrated sulfuric acid was added to the leach slurry in order to leach more saprolite ore

TABLE 4

Results of saprolite atmospheric leaching with autoclave discharge at 90° C. Additional sulfuric acid was added to tests 3–5.

| Test No. | Sample ID | Wt (g) | Composition (%) Ni | Fe | Mg | from | Extraction (%) Ni | Mg |
|---|---|---|---|---|---|---|---|---|
| 1 | Limonite ore | 738 | 1.95 | 37.5 | 3.55 |  |  |  |
|   | HPAL residue | 650 | 0.13 | 43.7 | 0.9 | Limonite | 94.2 | 76.5 |
|   | Saprolite ore | 110 | 1.91 | 7.6 | 15.6 | Saprolite | 70.8 | 66.0 |
|   | Final residue | 722 | 0.20 | 40.1 | 1.7 | Overall | 91.2 | 72.3 |
| 2 | Limonite ore | 721 | 1.89 | 36.4 | 3.35 |  |  |  |
|   | HPAL residue | 634 | 0.09 | 44.1 | 0.9 | Limonite | 95.8 | 77.5 |
|   | Saprolite ore | 120 | 1.91 | 7.6 | 15.6 | Saprolite | 66.1 | 64.4 |
|   | Final residue | 724 | 0.19 | 40.1 | 1.7 | Overall | 91.5 | 71.8 |
| 3 | Limonite ore | 802 | 1.97 | 37.9 | 3.44 |  |  |  |
|   | HPAL residue | 705 | 0.11 | 41.0 | 1.0 | Limonite | 95.3 | 75.6 |
|   | Saprolite ore | 335 | 1.91 | 7.6 | 15.6 | Saprolite | 80.4 | 66.0 |
|   | Final residue | 897 | 0.22 | 33.8 | 2.7 | Overall | 91.0 | 69.3 |
| 4 | Limonite ore | 658 | 1.88 | 36.5 | 3.46 |  |  |  |
|   | HPAL residue | 579 | 0.13 | 41.7 | 0.9 | Limonite | 93.7 | 76.0 |
|   | Saprolite ore | 245 | 1.91 | 7.6 | 15.6 | Saprolite | 76.1 | 67.2 |
|   | Final residue | 741 | 0.26 | 34.6 | 2.4 | Overall | 88.9 | 70.5 |
| 5 | Limonite ore | 790 | 2 | 36.9 | 3.66 |  |  |  |
|   | HPAL residue | 695 | 0.14 | 41.60 | 0.96 | Limonite | 94.0 | 76.8 |
|   | Saprolite ore | 315 | 1.91 | 8.25 | 15.00 | Saprolite | 74.9 | 73.2 |
|   | Final residue | 927 | 0.27 | 32.90 | 2.09 | Overall | 88.7 | 74.6 |

These results demonstrate that saprolite ore can be used to neutralize the free acid in the autoclave discharge from a high-pressure acid leach of limonite ore, while obtaining high nickel extractions from this high magnesium ore fraction. The results also show that it is possible to vary the saprolite to limonite ratio by adding extra sulfuric acid to the autoclave discharge.

EXAMPLE 4

This example shows a method of iron control by precipitation of jarosite after leaching of limonite ore at high pressure and temperature and neutralization of the remaining acid with saprolite ore at 90° C. Limonite ore was first leached in a titanium autoclave for 30 minutes at an acid to ore ratio of 0.38, 270° C. and 40 wt % solids. After leaching and pressure letdown, saprolite ore was added as a 50 wt % slurry to neutralize the remaining free acid in the autoclave discharge slurry (ACD) at atmospheric pressure and 90° C. Concentrated sulfuric acid was also added to the ACD to be able to leach more saprolite ore and increase the saprolite to limonite ratio to 0.4. Sodium sulfate was added to the saprolite slurry before addition to the ACD to provide a source of alkali ions for jarosite formation. The final step, after saprolite leaching, consisted of precipitating the iron in solution as natro-jarosite. This was achieved by maintaining the free acid concentration at around 5 g/l $H_2SO_4$ (pH~1.5) and the temperature at about 95° C. for an additional 3 hours. The free acid concentration was kept at the mentioned level by periodic additions of $CaCO_3$ slurry after 200 minutes of leaching. Results from this test are shown in Tables 5 and 6.

TABLE 5

Results of saprolite atmospheric leaching with autoclave discharge at 90° C. followed by jarosite precipitation.

| Test No. | Sample ID | Wt (g) | Composition (%) | | | Extraction (%) | | |
|---|---|---|---|---|---|---|---|---|
| | | | Ni | Fe | Mg | from | Ni | Mg |
| 6 | Limonite ore | 355 | 1.92 | 35.7 | 4.9 | | | |
| | HPAL residue | 312 | 0.13 | 40.7 | 1.4 | Limonite | 94.1 | 73.9 |
| | Saprolite ore | 140 | 1.91 | 7.3 | 16.1 | Saprolite | 75.3 | 69.7 |
| | Final residue | 448 | 0.24 | 32.6 | 2.5 | Overall | 88.8 | 71.5 |

TABLE 6

Kinetics of saprolite atmospheric leaching with autoclave discharge at 90° C. followed by jarosite precipitation.

| Time (min) | Solution concentration (g/L) | | | | | Extraction (%) | |
|---|---|---|---|---|---|---|---|
| | $H_2SO_4$ | Ni | Fe | Mg | Na | Ni | Mg |
| 0 | 76 | 0 | 0 | 0 | 4.2 | 0 | 0 |
| 20 | 46.6 | 7.42 | 3.66 | 15.9 | 4.15 | 33.5 | 24.6 |
| 60 | 15.7 | 7.96 | 4.82 | 21.4 | 3.87 | 63.5 | 56.9 |
| 120 | 10.3 | 7.75 | 4.52 | 22.1 | 3.97 | 57.9 | 62.0 |
| 180 | 10.1 | 7.48 | 3.70 | 22.1 | 4.03 | 49.6 | 63.5 |
| 230 | 3.0 | 7.78 | 1.00 | 22.8 | 3.93 | 68.0 | 69.1 |
| 280 | 5.2 | 7.81 | 0.92 | 23.4 | 3.81 | 73.5 | 73.8 |
| 330 | 4.4 | 7.83 | 0.56 | 22.6 | 3.78 | 76.5 | 70.8 |

These results, once again, show that saprolite was effectively used to neutralize the acid in the autoclave discharge and to leach a high proportion of the nickel contained within the saprolite ore. At the end of the atmospheric leach step, iron in solution decreased from a maximum of about 5 g/l by the formation of jarosite until the iron concentration in solution reached about 0.5 g/l. The low nickel assay of the final residue after jarosite precipitation was achieved despite the precipitation of approx. 5 g/L iron as jarosite.

EXAMPLE 5

This example illustrates the continuous processing of limonite ore under high-pressure acid leach (HPAL) conditions followed by the processing of saprolite ore under atmospheric leach (AL) conditions.

A limonite ore slurry at 38.5 wt. % solids was leached at high pressure and temperature (270° C. and 820 psi) at an acid to ore ratio of 0.4 tonnes acid/tonne ore in a continuous autoclave. Limonite was processed at a rate of 0.8 dry tonnes/day yielding an autoclave retention time of 30 minutes. The discharge from the autoclave consisted of HPAL residue and leach solution containing metals and free sulfuric acid (92 g/L). The compositions of the ore fed to the autoclave and the discharge residue, as well as the calculated metal extractions, are shown in Table 7.

TABLE 7

High pressure acid leaching (HPAL) results.

| | Al (%) | Co (%) | Cr (%) | Fe (%) | Mg (%) | Mn (%) | Ni (%) |
|---|---|---|---|---|---|---|---|
| Limonite feed | 2.82 | 0.125 | 1.47 | 34.4 | 3.72 | 0.71 | 1.63 |
| HPAL residue | 2.62 | 0.000 | 1.54 | 39.5 | 0.93 | 0.17 | 0.075 |
| Extraction | 20.0% | 100.0% | 9.5% | 1.1% | 78.4% | 79.7% | 96.0% |

The autoclave discharge slurry was mixed with saprolite ore (at 46 wt. % solids) in the proportion of 0.3 tonnes saprolite/tonne limonite. Sodium was added as sodium sulfate to the water used to prepare the saprolite ore slurry. Sulfuric acid was added to the mixture in the proportion of 0.46 tonnes concentrated acid/tonne saprolite. The concentrated acid combined with the residual acid from the HPAL yielded an acid to saprolite ratio of 0.96 tonnes acid/tonne saprolite. The overall concentrated acid to ore ratio was 0.41 tonnes acid/tonne ore (limonite plus saprolite).

The atmospheric leach circuit (AL) consisted of 3 tanks in series with an overall retention time of 4.2 hours (1.4 hours/tank). This circuit was followed by a jarosite precipitation circuit (JP) consisting of 2 tanks in series with an overall retention time of 5.9 hours (first tank 1.4 hours, second tank 4.5 hours). Limestone slurry was added to the jarosite precipitation tanks to control the slurry pH. Average conditions of these tanks over the test duration of approximately 70 hours are presented in Table 8:

TABLE 8

Atmospheric Leach and Iron Precipitation Conditions

| Tank | pH | Free Acid (g/L) | Temperature (° C.) |
|---|---|---|---|
| AL1 |  | 37.7 | 97 |
| AL2 |  | 33.5 | 92 |
| AL3 |  | 27.1 | 94 |
| JP1 | 1.5 | 10.5 | 94 |
| JP2 | 1.9 | 5.9 | 92 |

The compositions of the residues resulting from the consecutive operations and the calculated metal extractions from saprolite in atmospheric leaching and the overall extractions from HPAL followed by atmospheric leaching are given in Table 9.

TABLE 9

Ore and Leach Residue Compositions and Metal Extractions for Each Stage

|  | Al (%) | Co (%) | Cr (%) | Fe (%) | Mg (%) | Mn (%) | Ni (%) |
|---|---|---|---|---|---|---|---|
| Limonite ore | 2.82 | 0.125 | 1.47 | 34.4 | 3.72 | 0.71 | 1.63 |
| Saprolite ore | 1.58 | 0.085 | 0.85 | 11.4 | 14.83 | 0.48 | 1.31 |
| HPAL residue | 2.62 | 0.000 | 1.54 | 39.5 | 0.93 | 0.17 | 0.075 |
| AL residue | 2.45 | 0.027 | 1.38 | 32.9 | 2.00 | 0.23 | 0.13 |
| JP residue | 2.04 | 0.007 | 1.19 | 29.2 | 1.53 | 0.18 | 0.092 |
| Extraction from saprolite | 17.6% | 82.6% | 13.9% | −5.4% | 73.3% | 38.8% | 85.6% |
| Extraction from limonite and saprolite | 20.0% | 97.5% | 10.3% | 0.6% | 75.6% | 72.8% | 94.1% |

The solutions resulting from the leaching and precipitation stages show the increase in nickel and cobalt content as well as the decrease in free acidity. The Fe content initially increased during the atmospheric leaching stage, but subsequently decreased during jarosite precipitation, as shown in Table 10.

TABLE 10

Solution Compositions after Each Stage

|  | Al (mg/L) | Co (mg/L) | Cr (mg/L) | Fe (mg/L) | Mg (mg/L) | Mn (mg/L) | Ni (mg/L) | Free Acid (g/L) |
|---|---|---|---|---|---|---|---|---|
| HPAL solution | 2741 | 695 | 491 | 2463 | 16847 | 3791 | 9826 | 92 |
| AL solution | 3728 | 825 | 768 | 13715 | 33066 | 4472 | 12084 | 27 |
| JP solution | 2819 | 820 | 587 | 1417 | 35663 | 4500 | 12591 | 5.9 |

EXAMPLE 6

This example illustrates the continuous processing of limonite ore under high pressure acid leach (HPAL) conditions followed by the processing of saprolite ore under atmospheric leach (AL) conditions.

A limonite ore slurry at 35 wt. % solids was leached at high pressure and temperature (270° C. and 820 psi) at an acid to ore ratio of 0.34 tonnes acid/tonne limonite in a continuous autoclave. Limonite was processed at a rate of 0.8 dry tonnes/day yielding an autoclave retention time of 30 minutes. The discharge from the autoclave consisted of HPAL residue and leach solution containing metals and free acid (102 g/L). The compositions of the ore fed to the autoclave and the discharge residue, as well as the calculated metal extractions, are shown in Table 11.

TABLE 11

High pressure acid leaching (HPAL) results

|  | Co (%) | Fe (%) | Mg (%) | Ni (%) |
|---|---|---|---|---|
| Limonite feed | 0.11 | 40.33 | 2.79 | 1.66 |
| HPAL residue | 0.004 | 43.8 | 0.82 | 0.091 |
| Extraction | 96.1% | 1.2% | 70.5% | 94.8% |

The autoclave discharge slurry was mixed with saprolite ore (at 51 wt. % solids) in the proportion of 0.38 tonnes saprolite/tonne limonite. Sodium was added as sodium sulfate to the water used to prepare the saprolite ore slurry. Sulfuric acid was added to the mixture in the proportion of 0.23 tonnes concentrated acid/tonne saprolite. The concentrated acid combined with the residual acid from the HPAL yielded an acid to saprolite ratio of 0.59 tonnes acid/tonne saprolite. The overall concentrated acid to ore ratio was 0.31 tonnes acid/tonne ore (limonite plus saprolite).

The atmospheric leach circuit (AL) consisted of 4 tanks. Half the saprolite was added to the first tank (1 hour retention) along with the concentrated sulfuric acid, while the other half was added to the second tank (1.4 hour retention) along with the autoclave discharge slurry. The first tank overflowed into the second tank, which then overflowed into 2 tanks in series (1.4 hour retention each). This circuit was followed by a jarosite precipitation circuit (JP) consisting of 2 tanks in series with an overall retention time of 5.9 hours (first tank 1.4 hours, second tank 4.5 hours). Limestone slurry was added to the jarosite precipitation tanks to control the slurry pH. Average conditions of these tanks over the test duration of approximately 82 hours are presented in Table 12:

TABLE 12

Atmospheric Leach and Iron Precipitation Conditions

| Tank | pH | Free Acid (g/L) | Temperature (° C.) |
|---|---|---|---|
| AL1 |  | 54.4 | 71 |
| AL2 |  | 21.5 | 92 |
| AL3 |  | 20.3 | 91 |
| AL4 |  | 14.7 | 91 |
| JP1 | 1.7 | 7.6 | 94 |
| JP2 | 2.1 | 6.5 | 93 |

The compositions of the residues resulting from the consecutive operations and the calculated metal extractions from saprolite in atmospheric leaching and the overall extractions from HPAL followed by atmospheric leaching are given in Table 13.

TABLE 13

Ore and Leach Residue Compositions and Metal Extractions for Each Stage

|  | Co (%) | Fe (%) | Mg (%) | Ni (%) |
|---|---|---|---|---|
| Limonite feed | 0.11 | 40.33 | 2.79 | 1.66 |
| Saprolite ore | 0.088 | 11.4 | 14.2 | 1.30 |
| HPAL residue | 0.004 | 43.8 | 0.82 | 0.091 |
| AL residue | 0.016 | 36.7 | 1.83 | 0.147 |
| JP residue | 0.018 | 33.0 | 1.83 | 0.132 |
| Extraction from saprolite | 42.9% | −4.7% | 62.7% | 76.5% |
| Extraction from limonite and saprolite | 83.6% | 0.6% | 69.9% | 91.8% |

The solutions resulting from the leaching and precipitation stages show the increase in metals content as well as the decrease in free acidity. The Fe content initially increased during the atmospheric leaching stage, but subsequently decreased during jarosite precipitation, as shown in Table 14.

TABLE 14

Solution Compositions after Each Stage

|  | Al (mg/L) | Co (mg/L) | Cr (mg/L) | Fe (mg/L) | Mg (mg/L) | Mn (mg/L) | Ni (mg/L) | Free Acid (g/L) |
|---|---|---|---|---|---|---|---|---|
| HPAL solution | 4391 | 764 | 719 | 3820 | 17220 | 4264 | 12030 | 102 |
| AL solution | 3261 | 698 | 640 | 6618 | 32628 | 3982 | 11228 | 14.7 |
| JP solution | 3343 | 757 | 547 | 1568 | 35399 | 4279 | 12185 | 6.5 |

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed:

1. A hydrometallurgical sulfuric acid leaching process for the extraction of nickel and cobalt from nickeliferous laterite oxide ore that comprises:
   a. providing an aqueous pulp of nickeliferous oxide ore with a low magnesium content;
   b. leaching the aqueous pulp at a temperature of at least about 200° C. and at an elevated pressure with an addition of sulfuric acid at least sufficient stoichiometrically to effect the leaching of contained nickel and cobalt and thereby provide a leach liquor discharge of nickel sulfate, cobalt sulfate and a leach residue, wherein the leach liquor contains between 76 and 114 g/L of sulfuric acid;
   c. adding controlled quantities of a raw, high magnesium containing nickeliferous oxide ore to the leach liquor from step (b) at atmospheric pressure to yield a final neutralization slurry, wherein
      (i) the raw ore is added at temperatures of from 80° C. up to the atmospheric pressure boiling point of the final neutralization slurry,
      (ii) sufficient agitation and time are provided to effect the extraction of nickel and cobalt from the raw ore, wherein between 73 and 94% of the nickel present in the nickeliferous laterite oxide ore is extracted, and
      (iii) a reducing agent is not added to the final neutralization slurry to control its oxidation/reduction potential; and
   d. adding a sufficient amount of a precipitating agent selected from the group consisting of alkali metal ions, ammonium ions, and mixtures thereof, to the pulp of step (a), leach liquor of step (b), or final neutralization slurry of step (c) to precipitate ferric iron as jarosite.

2. The process of claim 1 wherein the leach liquor and leach residue of step (b) are not separated before step (c).

3. The process of claim 1, further comprising leaching a portion of the raw, high magnesium containing nickeliferous oxide ore at atmospheric pressure with sulfuric acid before adding the raw ore to the leach liquor of step (b).

4. The process of claim 1 further comprising adding to the final neutralization slurry a neutralization agent selected from the group consisting of alkali and alkaline earth oxides, hydroxides, carbonates, and mixtures thereof.

5. The process of claim 1 further comprising subjecting the final neutralization slurry to a solid/liquid separation step to produce a final pregnant leach liquor suitable for recovery of nickel and cobalt and a final leach residue.

6. The process of claim 1 further comprising grinding the raw, high magnesium containing nickeliferous oxide ore before adding the raw ore to the leach liquor of step (b).

7. The process of claim 1, wherein the leach liquor of step (b) contains between 92 g/L and 114 g/L of sulfuric acid.

8. The process of claim 1, wherein the leach liquor of step (b) contains between 102 g/L and 114 g/L of sulfuric acid.

9. The process of claim 1, wherein the pH of the final neutralization slurry is not controlled during addition of the raw, high magnesium containing nickeliferous ore.

10. A process for the extraction of nickel and cobalt from nickeliferous laterite oxide ore that comprises sequentially:
   a. providing an aqueous pulp of nickeliferous oxide ore with a low magnesium content;
   b. leaching the aqueous pulp at a temperature of at least 200° C. and at a pressure above atmospheric with an amount of sulfuric acid at least stoichiometrically sufficient to leach contained nickel and cobalt to provide an above atmospheric pressure leach liquor of nickel sulfate, cobalt sulfate, and a leach residue, wherein the leach liquor contains between 76 and 114 g/L of sulfuric acid;
   c. discharging the above atmospheric pressure leach liquor comprising nickel sulfate, cobalt sulfate, acid, and a leach residue from step (b) to atmospheric pressure;
   d. adding a raw, untreated high magnesium containing nickeliferous oxide ore and additional sulfuric acid to the atmospheric pressure leach liquor from step (c) to yield a final neutralization slurry, wherein
      (i) the raw ore and additional sulfuric acid are added at temperatures of from 80° C. up to the atmospheric pressure boiling point of the final neutralization slurry,
      (ii) sufficient agitation and time are provided to effect the extraction of nickel and cobalt from the raw ore, wherein between 73 and 94% of the nickel present in the nickeliferous laterite oxide ore is extracted, and
      (iii) a sufficient amount of a precipitating agent selected from the group consisting of alkali metal ions, ammonium ions, and mixtures thereof, is added to the pulp of step (a), leach liquor of step (c), or final neutralization slurry of step (d) to precipitate ferric iron as jarosites;
   e. adding a neutralization agent selected from the group consisting of alkali and alkaline earth oxides, hydroxides, carbonates, and mixtures thereof to the final neutralization slurry of step (d) to yield a neutralized leach slurry; and,
   f. subjecting the neutralized leach slurry to a solid/liquid separation step to produce a final pregnant leach liquor suitable for recovery of nickel and cobalt and a final leach residue.

11. The process of claim 10, wherein the leach liquor and leach residue of step (b) are not separated before step (d).

12. The process of claim 10, wherein the leach liquor of step (b) contains between 92 g/L and 114 g/L of sulfuric acid.

13. The process of claim 10, wherein the leach liquor of step (b) contains between 102 g/L and 114 g/L of sulfuric acid.

14. The process of claim 10, wherein a reducing agent is not added to the final neutralization slurry to control the oxidation/reduction potential.

15. The process of claim 10, wherein the pH of the final neutralization slurry is not controlled during addition of the raw, high magnesium containing nickeliferous ore.

16. A process for the extraction of nickel and cobalt from nickeliferous laterite oxide ore that comprises sequentially;
   a. providing an aqueous pulp of nickeliferous oxide ore with a low magnesium content;
   b. leaching the aqueous pulp at a temperature of at least 200° C. and at a pressure above atmospheric with an amount of sulfuric acid at least stoichiometrically sufficient to effect the leaching of contained nickel and cobalt to provide an above atmospheric pressure leach liquor of nickel sulfate, cobalt sulfate, and a leach residue, wherein the leach liquor contains between 76 and 114 g/L of sulfuric acid;
   c. discharging the above atmospheric pressure leach liquor comprising nickel sulfate, cobalt sulfate, acid, and a leach residue from step (b) to atmospheric pressure;
   d. then adding a raw, untreated high magnesium containing nickeliferous oxide ore and optionally adding additional sulfuric acid to the atmospheric pressure leach liquor from step (c) to yield a final neutralization slurry, wherein
      (i) the raw ore and optional sulfuric acid are added at temperatures of from 80° C. up to the atmospheric pressure boiling point of the final neutralization slurry,
      (ii) sufficient agitation and time are provided to effect the extraction of nickel and cobalt from the raw ore, wherein between 73 and 94% of the nickel present in the nickeliferous laterite oxide ore is extracted, and
      (iii) a reducing agent is not added to the final neutralization slurry to control its oxidation/reduction potential;
   e. adding a sufficient amount of a precipitating agent selected from the group consisting of alkali metal ions, ammonium ions, and mixtures thereof, to the final neutralization slurry of step (d) to precipitate ferric iron as jarosites; and,
   f. subjecting the slurry from step (e) to a solid/liquid separation step to produce a final pregnant leach liquor suitable for recovery of nickel and cobalt and a final leach residue.

17. The process of claim 16, wherein the leach liquor and leach residue of step (b) are not separated before step (d).

18. The process of claim 16, wherein the leach liquor of step (b) contains between 92 g/L and 114 g/L of sulfuric acid.

19. The process of claim 16, wherein the leach liquor of step (b) contains between 102 g/L and 114 g/L of sulfuric acid.

20. The process of claim 16, wherein the pH of the final neutralization slurry is not controlled during addition of the raw, high magnesium containing nickeliferous ore.

* * * * *